3,161,653
2-[(2'-METHYL - BENZO - THIENYL - 3') - METHYL]-
   $\Delta^2$-IMIDAZOLINE AND ITS PHARMACEUTICAL-
   LY ACCEPTABLE ACID ADDITION SALTS
Wolfgang Fruhstorfer and Helmut Müller-Calgan, Darmstadt, Germany, assignors to E. Merck Aktiengesellschaft, Darmstadt, Germany
No Drawing. Filed Nov. 21, 1961, Ser. No. 154,053
Claims priority, application Germany, Nov. 23, 1960,
   M 47,194
2 Claims. (Cl. 260—309.6)

This invention relates to novel imidazoline derivatives having vasoconstricting and blood-pressure-increasing properties.

The principal object of this invention is to provide novel imidazoline derivatives and acid addition salts thereof, and a process of administering these derivatives to animal life to effect a vasoconstricting effect.

Another object is to provide a novel process for the preparation of these derivatives, and to provide intermediate compounds as a consequence thereof.

Still other objects and advantages will become apparent upon further study of the specification and appended claims.

The main novel imidazoline derivative of this invention is 2-[(2'-methyl-benzo-thienyl-3')-methyl] - $\Delta^2$ - imidazoline, structurally represented by Formula I, as follows:

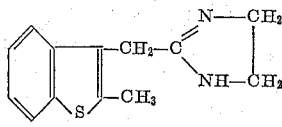

I

The acid-addition salts of the foregoing compound are also included in this invention, preferably pharmaceutically acceptable acids such as hydrohalic acids, sulfuric acid, orthophosphoric acid, alkancarboxy acids such as acetic acid, propionic acid and their higher homologs up to 12 carbon atoms, polybasic acids, such as oxalic acid, tartaric acid, succinic acid, maleic acid, ascorbic acid, citric acid, etc.; sulfonic acids, such as methane sulfonic acid, ethane sulfonic acid, benzene sulfonic acid or p-toluene sulfonic acid, aromatic carboxy acids, such as benzoic acid, salicylic acid or p-amino salicylic acid.

These new compounds are vasoconstrictors and cause, when applied locally, a rapid and long-lasting constriction of the membranes in the nose and throat areas and on the eye. All tests have proven the superiority of these compounds over comparative substances with regard to degree and period of efficiency. In a CNS-screening test on mice an oral does of only 300 µg./kg. 2-[(2'-methyl-benzo-thienyl-3')-methyl]-$\Delta^2$-imidazoline caused enlargement of the lid openings and the hair to stand on end, whereas commercial solutions of xylometazoline hydrochloride and tetrahydrozoline as well as naphthazoline nitrate, in the same test, were 3–7 times less efficient.

Furthermore, the compound according to this invention has twice as much effect as compared to the known 2-(naphthyl-1'-methyl)-2-imidazoline, the period of effect being 1.3–1.5 times as long. As compared to the 2-(2', 6'-dimethyl-4'-tert.-butyl-benzyl)-2-imidazoline, its effect is 5 times greater, the period of effect being the same.

The new compound may be utilized, on account of its vasoconstricting effects, as a medicine for constricting membranes, especially nasal membranes.

The new compounds can be employed in aqueous solutions of 1:2000 and 1:4000. For children a concentration of 1:4000 is recommended. For colds as well as affected sinus, 2–4 drops of the compound 1 to 3 times daily are to be inserted into each nostril. The solutions are to be employed generally for the constriction of the membranes for diagnostic purposes, mainly for rhinitis (acute, allergic, vasomotoric), sinusitis, nasopharyngitis, larygnitis, conjunctivitis, and geratitis.

The drops, or spray solutions, prepared for the purpose of constricting human nasal membranes are preferably produced with the addition of a buffer system and a small amount of a bacteri-cide. Solutions of the following type, for example, can be employed:

EXAMPLE A

| | |
|---|---|
| 2-[(2'-methyl - benzo - thienyl-3')-methyl]-$\Delta^2$-imidazoline hydrochloride _____g__ | 0.5 |
| Sodium borate _____g__ | 2.65 |
| Boric acid _____g__ | 17.1 |
| β-Phenylethylalcohol _____g__ | 2.5 |
| Water _____ml__ | 1000.0 |

EXAMPLE B

| | |
|---|---|
| 2-[(2'-methyl - benzo - thienyl-3')-methyl]-$\Delta^2$-imidazoline hydrochloride _____g__ | 0.5 |
| Boric acid _____g__ | 5.7 |
| Sodium acetate (3H$_2$O) _____g__ | 14.0 |
| Tert. trichlorbutanol _____g__ | 5.0 |
| Potassium sorbate _____g__ | 1.0 |
| Water _____ml__ | 1000.0 |

Due to its blood pressure-increasing properties, the new compound can also be employed as a circulation medicine for shock conditions. In this case, the compound of Formula I may be applied by injection or permanent drop infusion in sterilized physiological salt solutions.

According to this invention, the new derivative and the acid addition salts thereof can be produced as follows—

(2-methyl-benzo-thienyl-3)-acetic acid or one of the functional acid derivatives thereof can be utilized as a reactant material. A compound of this group can be reacted either with ethylene diamine itself; or with a N-acyl derivative of ethylene diamine; or with ammonia, or ammonia-yielding agents and a compound which can be converted into ethylene diamine by a treatment with ammonia. The (2-methyl-benzo-thienyl)-acetic acid is prepared from 2-methyl-benzo-thiophen (cf. Chemical Abstracts, vol. 53, col. 5229, 1959) by chloromethylation (reaction with formaldehyde and hydrochloric acid) in a known manner and by reacting the thus obtained 2-chloro-methyl-benzo-thiophen with sodium cyanide to form the corresponding nitrile which may be saponified in the usual way.

It is also possible to utilize for example, esters, ortho esters, acid chloride, amides, thioamides, amidines, imino ether, thioimino ether, imino halogenides or the nitrile of this acd as functional acid derivatives of the (2-methyl-benzo-thienyl-3)-acetic acid. For this purpose, the reaction conditions may be chosen so that the functional acid derivatives are formed only during the reaction.

Besides ethylene diamine, reactive N-derivatives of the ethylene diamine can also be employed. These ethylene diamine derivatives are particularly suited which, in the course of a reaction with carboxy acids or the functional derivatives thereof, yield imidazolines not substituted on the nitrogen atom. Compounds of this nature are for example N-acyl ethylene diamine, wherein the acyl groups preferably possess 2–4 carbon atoms, furthermore, N,N'-diacyl ethylene diamines which may also be of cyclic nature, such as for example ethylene urea or ethylene thiourea.

Compounds which are convertible into ethylene diamine by means of treatment with ammonia are for example ethanolamine and the esters thereof, beta-halogen ethylamines, such as beta-chloroethylamine, ethylene dihalogenides, such as 1,2-dichloroethane, or ethylene chlorohydrin. Ethylene diamine or its derivatives can be employed either as free bases or in the form of their mono- or disalts. Thus, the ethylene diamine can be employed for example as the mono-p-toluene sulfonic acid salt.

An acid amide for example can act in the same way as ammonia, so that, during the reaction of (2-methyl-benzo-thienyl-3)-acetamide with bromoethylamine, cyclization to the imidazoline derivative occurs.

If the nitrile of the (2-methyl-benzo-thienyl-3)-acetic acid is utilized as the reactant material and is reacted with ethylene diamine or its derivatives, it is preferable to carry out the reaction in the presence of hydrogen sulfide or hydrogen sulfide-yielding agents, such as carbon disulfide.

The reactions described may lead either directly or stepwise to the imidazoline derivative of Formula I.

Thus there are obtained intermediate compounds such as for example that represented by Formula Ia, as follows:

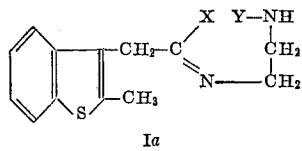

Ia

Ia wherein
X represents OH, SH or $NH_2$
and
Y represents H or an acyl radical having 1 carbon atom to 6 carbon atoms.

From compounds of this nature or their tautomeric forms, the substituents X and Y can be separated as XY according to conventional methods. For example, water can be separated from a compound of Formula Ia, wherein X=OH and Y=H, by the simple expedient of utilizing calcium oxide as a dehydration agent with good yields of the desired imidazoline derivative of Formula I being thereby formed.

Additionally, an intermediate product can be obtained, corresponding to that represented by Formula Ib, as follows:

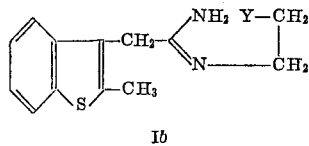

Ib

Ib where Y represents a substituent replaceable by an amine group such as halogen, or an hydroxyl group.

From such compounds or their tautomerec forms, the substituent Y can be separated in the form of HY, forming an imidazoline ring. Intermediate products of this type are somewhat unstable compounds, which convert to the desired imidazoline compound of Formula I when boiled in an inert solvent, thereby separating HY. The separation reaction proceeds very smoothly when Y is halogen. The reaction also yields good results when Y=OH and the operation is conducted under dehydrating conditions.

In the course of the stepwise formation of the imidazoline derivative of Formula I, there can be obtained as a further intermediate product, compounds of Formula Ic, as follows:

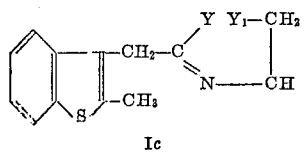

Ic

Ic where Y and $Y_1$ represent the same or different substituents replaceable by an amine group, said substituents being like those described in Formula Ib.

If a compound of this type or the tautomeric form thereof is treated with ammonia or ammonia-yielding agents, the imidazoline derivative of Formula I is obtained. The reaction procedure is very smooth when Y and $Y_1$=halogen, especially chlorine.

Further in accordance with this invention, the imidazoline derivative of Formula I can also be obtained by the isomerization of a compound of Formula II or III, as follows:

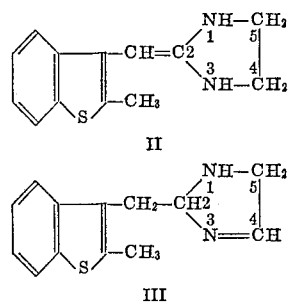

II

III

The double bond at the 2-carbon position in Formula II, or the double bond in the 3,4-position of Formula III is shifted into the 2,3-position. Such isomerizations are preferably accomplished in an acidic aqueous solution, for example, in the presence of a small excess of hydrochloric acid. The isomerization occurs when the reaction mixture is at room temperature or when the reaction solution is slightly heated.

The new imidazoline derivative of Formula I can also be prepared from a compound corresponding to Formula IV, as follows:

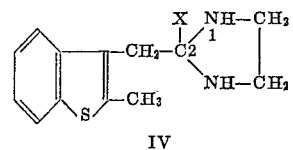

IV wherein X represents OR or a halogen
and
R represents H, an acyl group having 1–6 carbon atoms, or a lower aliphatic hydrocarbon having 1–6 carbon atoms.

The imidazoline derivative is made by separating the substituent X as HX. If X equals halogen, the separating process is carried out under the conventional conditions of a halogen hydrogen separation, for example by treatment with collidine or pyridine. In case X equals hydroxyl, the separation is accomplished by treatment with a conventional dehydration agent. If R is an aromatic or higher aliphatic acyl group, for example the benzoyl radical, it is possible to introduce the 1,2-double bond into the heterocyclic portion by merely heating, while benzoic acid is separated.

Depending on the method used, the new imidazoline derivative is obtained as a free base or in the form of one of its acid addition salts. From the free base, various acid addition salts can be prepared by treatment with acids according to known methods. For the production of such salts, those acids are preferred which are pharmaceutically acceptable acids, such as hydrohalic acids, sulfuric acid, orthophosphoric acid, alkane carboxy acids such as acetic acid, propionic acid and their higher homologs up to 12 carbon atoms, polybasic acids, such as oxalic acid, tartaric acid, succinic acid, maleic acid, ascorbic acid, citric acid, etc.; sulfonic acids, such as methane sulfonic acids, ethane sulfonic acid, benzene sulfonic acid or p-toluene sulfonic acid, aromatic carboxy acids, such as benzoic acid, salicylic acid or p-amino salicylic acid.

To further illustrate the processes which can be employed to manufacture the novel compounds of this invention, the following examples are preferred specific embodiments thereof, but are not to be considered as limitative of the specification and appended claims.

Example 1

9.35 g. of (2-methyl-benzo-thienyl-3)-acetonitrile (prepared by chloromethylating 2-methyl-benzo-thiophene and reacting the chloromethyl derivative with NaCN, and crystallizing from petroleum ether, crystals melting at 78° C.) and 11.6 g. of ethylene diamine-mono-p-toluene sulfonate are mixed and heated in an oil bath to 225–230° C. for one to 1½ hours, and $NH_3$ is thereby separated. After being cooled, the reaction mixture is treated with approximately 50 ml. of an approximate 10% aqueous NaOH solution. The base precipitated thereby is vacuum filtered, dried and recrystallized from cyclohexane or cyclohexane petroleum ether. 7.5 g. of 2-[(2'-methyl-benzo-thienyl-3')-methyl]-$\Delta^2$-imidazoline corresponding to 65% of the theoretical yield are obtained, which compound, after repeated recrystallization, melts at 156–157° C.

By dissolving the free base in ethanolic hydrochloric acid and mixing with ether, the crystalline hydrochloride can be obtained in the usual manner, which hydrochloride melts when recrystallized from alcohol ether, at 248–250° C. If methanesulfonic acid is utilized instead of hydrochloric acid, the corresponding methane sulfonate is obtained.

Example 2

9.35 g. of (2-methyl-benzo-thienyl-3) acetonitrile, 3.2 g. of approximately 95% acetylene diamine and 0.25 ml. of carbondisulfide are mixed and heated to approximately 100° C. for 48 hours. After being cooled, the raw product is recrystallized from cyclohexane, whereby there is obtained 2-[(2'-methyl-benzo-thienyl-3')-methyl]-$\Delta^2$-imidazoline, M.P. 155° C.

Example 3

10.3 g. of (2-methyl-benzo-thienyl-3)-acetic acid and 11.6 g. of ethylene diamine-mono-p-toluene sulfonate are heated to 220–250 C. in an oil bath for 2–3 hours. After being cooled, the residue is processed according to Example 1, and 2-[(2'-methyl-benzo-thienyl-3')-methyl]-$\Delta^2$-imidazoline of M.P. 155–157° C. is obtained.

Example 4

4.7 g. of ethylene diamine are added slowly and under ice cooling, to 0.05 mol (2-methyl-benzo-thienyl-3)-acetyl chloride (produced from 10.3 g. of (2-methyl-benzo-thienyl-3)-acetic acid and 10 ml. of thionyl chloride). After the completed reaction, it is slowly heated to a bath temperature of 200–220° C. and the reaction mixture is kept at that temperature for about 2 hours. The mixture is cooled, the residue is treated with approximately 50 ml. of 10% aqueous sodium hydroxide and the base is extracted twice with 30 ml. of aliquot chloroform. After the chloroform is evaporated, the base is dissolved in 40 ml. of 10% hydrochloric acid and the neutral substances are removed by means of ether extraction. By adding an excess of 10% sodium hydroxide solution to the acid, aqueous extract, 2-[(2'-methyl-benzo-thienyl-3')-methyl]-$\Delta^2$-imidazoline is obtained which, after being vacuum filtered, and dried, is recrystallized from cyclohexane or cyclohexane petroleum ether, M.P. 153–155° C.

Example 5

10.25 g. of (2-methyl-benzo-thienyl-3)-acetamide and 11.6 g. of ethylene diamine-mono-p-toluene sulfonate are heated to 200–210° C. in an oil bath for 3 hours. After proceeding according to Example 1, there are obtained 6.8 g. of 2-[(2'-methyl-benzo-thienyl-3')-methyl]-$\Delta^2$-imidazoline which melts at 155–157° C. after recrystallization from cyclohexane.

Example 6

9.35 g. of (2-methyl-benzo-thienyl-3)-acetonitrile and 7.2 g. of N,N'-diacetyl ethylene diamine are heated to 240° C. in an oil bath for 3 hours. After being cooled, the dark raw product is processed according to Example 4, and 2-[(2'-methyl-benzo-thienyl-3')-methyl]-$\Delta^2$-imidazoline is obtained which melts at 152–155° C. after several recrystallizations.

Example 7

9.35 g. of (2-methyl-benzo-thienyl-3)-acetonitrile and 5.1 g. of mercapto imidazoline are heated to 250° C. in an oil bath for 3 hours. After proceeding according to Example 4, and after several recrystalilzations from cyclohexane petroleum ether, there are obtained 2-[(2'-methyl-benzo-thienyl-3')-methyl] - $\Delta^2$ - imidazoline, M.P. 152–155° C.

Example 8

0.05 mol. of raw (2-methyl-benzo-thienyl-3)-acetimino ethyl ether hydrochloride (produced from 9.35 g. of (2-methyl-benzo-thienyl-3)-acetonitrile and the calculated amount of ethanol and anhydrous hydrogen chloride are introduced into a solution of 4.0 g. of ethylene diamine monohydrate in 40 ml. of absolute alcohol and boiled under reflux for 4 hours. The alcohol is then distilled off, the residue is treated with approximately 50 ml. of approximately 10% sodium hydroxide solution and processed according to Example 4. The 2-[(2'-methyl-benzo-thienyl-3') - methyl] - $\Delta^2$ - imidazoline obtained thereby melts, after recrystallization, at 152–155° C.

Example 9

10.25 g. of (2-methyl-benzo-thienyl-3)-acetamide and 10.25 g. beta-bromoethyl amine-hydrobromide are heated to approximately 220–230° C. in an oil bath for 3 hours. The residue is processed as set forth in Example 4, and 2-[(2'-methyl-benzo-thienyl-3')-methyl]-$\Delta^2$-imidazoline is obtained which melts, after recrystallization from cyclohexane petroleum ether, at 152–155° C.

Example 10

10.25 g. of (2-methyl-benzo-thienyl-3)-acetamide and 10.3 g. of 1,2-dibromoethane are mixed with 10 g. of liquid $NH_3$ in an autoclave and agitated at 200–250° C. for 4 hours. After cooling, the excess ammonia gas is released, and the residue is processed as set forth in Example 4, and there is obtained 2-[(2'-methyl-benzo-thienyl-3')-methyl]-$\Delta^2$-imidazoline which melts at 151–153° C. after recrystallization.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. Imidazoline derivatives selected from the group consisting of 2 - [(2'-methyl-benzo-thienyl-3')-methyl]-$\Delta^2$-imidazoline and the pharmaceutically acceptable acid addition salts thereof.

2. 2-[(2'-methyl-benzo-thienyl-3')-methyl] - $\Delta^2$ - imidazoline.

(References on following page)

References Cited by the Examiner
UNITED STATES PATENTS

| | | | |
|---|---|---|---|
| 2,441,867 | 5/48 | Carlsson | 260—309.6 |
| 2,457,047 | 12/48 | Kyrides | 260—309.6 |
| 2,744,909 | 5/56 | Speeter | 260—309.6 |
| 2,780,577 | 2/57 | Phillips et al. | 167—65 |
| 2,955,073 | 10/60 | De Beer | 167—65 |
| 2,965,648 | 12/60 | Wiegand et al. | 260—309.6 |
| 2,995,564 | 8/61 | Duennenberger et al. | 260—309.2 |
| 3,010,972 | 11/61 | Kaiser et al. | 260—330.5 |
| 3,024,248 | 3/62 | Werner | 260—330.5 |
| 3,042,674 | 7/62 | Faust et al. | 260—309.6 |

OTHER REFERENCES

Blicke et al.: Jour. Amer. Chem. Soc., vol. 70, pp. 3768–70 (1948).

Scholz: Industrial and Engineering Chemistry vol. 37, pages 120–125 (1945).

IRVING MARCUS, *Primary Examiner*.

WALTER A. MODANCE, *Examiner*.